United States Patent [19]

Denton

[11] Patent Number: 5,576,262
[45] Date of Patent: Nov. 19, 1996

[54] GLYCOL ETHER COMPOUNDS FOR THE PRODUCTION OF POLYOLEFIN CATALYSTS AND SUPPORTS

[75] Inventor: Dean A. Denton, Baltimore, Md.

[73] Assignee: W. R. Grace & Co.-Conn., New York, N.Y.

[21] Appl. No.: 252,860

[22] Filed: Jun. 2, 1994

[51] Int. Cl.$^6$ .................................................. B01J 21/06
[52] U.S. Cl. ................... 502/233; 502/234; 502/236; 502/237; 423/326; 423/338; 423/339
[58] Field of Search .................................. 423/326, 338, 423/339; 502/233, 237, 234, 236

[56] References Cited

U.S. PATENT DOCUMENTS

| | | | |
|---|---|---|---|
| 3,887,494 | 6/1975 | Dietz | 252/452 |
| 3,900,457 | 8/1975 | Witt | 423/339 |
| 4,081,407 | 3/1978 | Short et al. | 252/458 |
| 4,152,503 | 5/1979 | Short et al. | 423/339 |
| 4,169,926 | 10/1979 | McDaniel | 423/339 |
| 4,436,882 | 3/1984 | Witt | 502/233 |
| 4,436,883 | 3/1984 | Witt | 502/233 |
| 4,476,243 | 10/1984 | Dombro | 502/236 |
| 5,206,189 | 4/1993 | Caldwell | 423/339 |

*Primary Examiner*—Michael Lewis
*Assistant Examiner*—Stuart L. Hendrickson
*Attorney, Agent, or Firm*—Mary Ann Capria

[57] ABSTRACT

A method of making chromium containing oxide gel-based catalyst wherein an oxide hydrogel is convened to a xerogel by azeotropic distillation of a mixture of said hydrogel and an organic solvent, the improvement comprising impregnating the gel with a chromium compound during azeotropic distillation by incorporating said chromium compound into said mixture before azeotropic distillation and wherein the organic solvent used is selected from the group consisting of ethoxy ethyl acetate, tert-butyoxy propanol, methoxy propyl acetate, n-butoxy propanol, ethoxy ethyl propionate and mixtures thereof.

11 Claims, No Drawings

5,576,262

GLYCOL ETHER COMPOUNDS FOR THE PRODUCTION OF POLYOLEFIN CATALYSTS AND SUPPORTS

BACKGROUND OF THE INVENTION

Oxide gel based materials (e.g. silica gels) are widely used as catalyst supports for the polymerization of olefins. Silica gel has been used as a support per se or has been used in the form of a cogel or tergel with metals such as chromium and titanium.

Oxide gels (including cogels and tergels) are most often commercially prepared by a gelation from an aqueous system to form a porous hydrogel containing water in its pores. For use in polymerization processes, it is generally necessary to remove the water from the hydrogel. Unfortunately, simple drying cannot be used to remove the water since shrinkage of the desired porosity will occur.

In order to overcome the water removal problem, several techniques have been attempted in the prior art. Many of these methods are discussed in numerous patents assigned to Phillips Petroleum Company. U.S. Pat. Nos. 3,900,457, 4,081,407, 4,152,503 and 4,436,883 discuss the use of azeotropic distillation techniques for removal of water from the gel while avoiding pore collapse. U.S. Pat. No. 4,169,926 discusses a process where the gel is given a one time impregnation with certain organic liquids followed by drying.

While azeotropic distillation has proven to be effective, there are various disadvantages associated with the known processes. For example, certain preferred organic solvents such as those described in U.S. Pat. No. 3,900,457 take a long time to achieve the desired distillation owing to their limited miscibility with water. On the other hand, the organic solvents used in U.S. Pat. Nos. 4,081,407 and 4,152,503 have resulted in more rapid water removal, but these various organic distillation liquids are relatively expensive in the quantities needed for commercial production. For Ti—Cr—SiO$_2$ systems, these azeotropic processes can result in excessively high melt index capability.

These problems have led to use of alternative techniques such as those described in U.S. Pat. Nos. 4,169,926 and 4,436,883. While these other techniques may be more economical than azeotropic distillation, the resulting catalyst is generally not as good can be obtained by azeotropic techniques.

Accordingly, there is a need for an economical azeotropic distillation technique for use in production of silica gel based materials for catalyst applications.

SUMMARY OF THE INVENTION

The invention provides improved methods of making oxide gel based materials for catalyst applications using azeotropic distillation. Particularly, it has been discovered that certain classes of organic compounds, namely glycol ethers and glycol ether esters, can be used to permit effective and economical production of oxide-containing gels (including cogels and tergels) for catalyst applications. The invention also provides improved gel based catalysts useful in polyolefin manufacture.

In one aspect, the invention encompasses a method of producing an oxide xerogel by removing water from an oxide hydrogel, the method comprising:

(a) contacting a water-containing oxide hydrogel with an organic liquid selected from the group consisting of glycol ethers, glycol ether esters and mixtures thereof, (b) removing water from the hydrogel resulting from step (a) by azeotropic distillation to form a gel containing the organic liquid, (c) removing the organic liquid from the gel resulting from step (b) to produce an oxide xerogel.

Preferred hydrogels are silica-containing hydrogels. If desired, the gel can be impregnated with catalytic species such as chromium before step (c) or after step (c). Preferably, the oxide xerogel is subsequently calcined. The method of the invention is especially suitable for use in the formation of polyolefin catalysts.

These and other aspects of the invention will be described in further detail below.

DETAILED DESCRIPTION OF THE INVENTION

The invention encompasses processes where organic liquids selected from the group consisting of glycol ethers, glycol ether esters, and mixtures thereof are used in the removal of water from oxide hydrogels by azeotropic distillation.

The starting oxide hydrogel may be prepared by virtually any known method. Preferably, the hydrogel is prepared by a method known to be suited for the production of supported polyolefin catalysts. U.S. Pat. Nos. 4,436,883, 4,152,503, 3,900,457 or 3,887,494 describe various methods for making hydrogels, however it should be understood that the invention is not limited to any particular oxide hydrogels nor any particular method of hydrogel production.

The oxide hydrogel may be of any known oxide hydrogel composition. While silica-containing hydrogels are preferred, the invention may also be used for other gel materials such as aluminum phosphate gels. The process can also be used with cogels (e.g. silica-titania or chromium-silica) and tergels (e.g. chromium-silica-titania). At least when used in connection with chromium-silica-titania systems, the invention method yields a product whose melt index potential can be varied as a function of the catalyst activation temperature.

If desired, the hydrogel may be impregnated with catalytic species such as chromium by any conventional technique before, during or after use of the method of the invention. U.S. Pat. No. 4,152,503 discloses various chromium compounds useful for such impregnation as well as suitable impregnation techniques. The amount of chromium in the final catalyst is preferably about 0.1–2.0 wt. %, more preferably about 0.5–1.5 wt. %. If it is desired to perform the impregnation during or after the method of the invention, then it is preferred to avoid the use of water as a carrier medium.

The hydrogel may be contacted with the organic liquid (i.e. glycol ether and/or glycol ether ester) by any conventional means to form a slurry. Preferably, the hydrogel is recovered from any aqueous washing or aging medium by filtration before contacting with the organic liquid. However, if desired, the organic liquid may be added to an aqueous slurry which contains the hydrogel. Agitation may be employed to facilitate mixing.

In azeotropic distillation, any conventional azeotropic distillation apparatus may be used. Thus, the organic liquid-hydrogel slurry would be placed in a container where the water-organic liquid mixture is then evaporated, and the effluent is cooled to separate the water from the organic liquid. The recovered organic liquid is then preferably circulated back to the slurry. Alternatively, fresh organic liquid may be added to the slurry during the course of distillation. If desired, the distillation can be conducted under reduced pressure to facilitate evaporation.

The amount of organic liquid in the initial slurry is preferably about 100–300 vol % based on the volume of hydrogel. Preferably, the slurry is heated to about 90°–110° C. during the distillation, more preferably about 100°–105° C. Once the water is removed, the temperature in the distillation apparatus may be raised to boil off the organic solvent. The pressure used during distillation is preferably ambient pressure. The distillation is preferably conducted until no water remains in the gel. The time needed to achieve complete water removal may depend on the distillation conditions used. Preferably, the distillation conditions are selected such that complete water removal is achieved in about 30 minutes–4 hours more preferably about 30–120 minutes.

The organic liquid used in the invention is selected from the group consisting of glycol ethers, glycol ether esters, and mixtures thereof. Preferred organic liquids are ethoxy ethyl acetate, tert-butoxy propanol, methoxy propyl acetate, n-butoxy propanol, and ethoxy ethyl propionate.

Where the method of the invention is used to make a polyolefin catalyst, catalytic species such as chromium may be added to the oxide gel before, during or after use of the method of the invention. The invention encompasses the discovery that chromium actually can be added to the catalyst support during the azeotroping step by use of a compatible chromium compound which is added directly with the organic azeotroping solvent. Most chromium compounds used for non-aqueous post-impregnation of xerogels can be used during the azeotroping step of the invention. Preferred chromium compounds are chromium acetylacetonate, chromium acetate, and chromium nitrate.

Once the water removal has been completed, the azeotroping solvent is preferably removed by evaporation followed by calcining. If desired, catalytic species may be added to the xerogel after calcination by any known method. To the extent that the catalytic species on or in the xerogel have not been activated, the catalyst may be activated by any conventional treatment.

Where chromium is used as a catalytic species, preferably activation of the chromium is avoided until the catalyst is ready to be used so that handling of toxic chromium VI (hexavalent) in minimized. Avoidance of chromium activation during the calcining to remove residual glycol compound can be achieved by use of the mild oxidizing calcination technique (at 425°–760° C.) described in U.S. patent application Ser. No. 08/066,368 filed on May 24, 1993, the disclosure of which is incorporated herein by reference, or by heating in nitrogen at about 400°–800° C.

When activation is desired, the catalyst may be treated according to any suitable known activation procedure. Typically, activation is accomplished by heating in air to about 650°–870° C. (1200°–1600° F.). Chromium-silica-titania catalyst products obtained by the invention advantageously exhibit a melt index capability which can be varied as a function of the activation temperature. Thus, 1200° F. activation results in a lower melt index capability than 1600° F. activation.

These and other aspects of the invention are further illustrated by the following examples. It should be understood that the invention is not limited to the specific details of the examples.

EXAMPLE 1

A silica-titania Hydrogel containing about 2.5 wt. % (dry basis) titanium 97.5 wt. % $SiO_2$ (dry basis) and a water content of about 80 wt. % was prepared.

100 g of the hydrogel were combined with 250 g of ethoxy ethyl acetate to form a slurry in a flask of Buchi Rotavapor® distillation apparatus. Chromium acetylacetonate was added with the ethoxy ethyl acetate in an amount to give about 1 wt. % Cr in the resulting dry catalyst. The mixture was heated to about 100° C. by immersing the flask in a 185° C. hot oil bath and distilled at ambient pressure until all the water was removed from the gel (about 60 minutes). During the distillation, the effluent containing a mixture of water and ethoxy ethyl acetate was treated to recover the organic phase which was then recirculated into the slurry. On completion of water removal, the temperature of the mixture approached the boiling point of the solvent.

The resulting Cr-containing silica-titania xerogel was then dried to remove the ethoxy ethyl acetate solvent. The resulting catalyst was then calcined at about 650° C. (1200° F.) in nitrogen. The catalyst was then milled and classified to an average particle size of about 150 microns.

The resulting catalyst was then used to polymerize ethylene after activating for 5 hours at 1500° F. in dry air. The polyethylene polymerization was done at. 109° C. in a two-liter stirred autoclave. The temperature was controlled and held constant to within 0.5° C. by adjusting the pressure of boiling methanol in the jacket surrounding the reactor. After the autoclave was filled with nitrogen and heated to about 102° C., about 0.05 gm of activated catalyst was transferred under nitrogen blanket into the autoclave, followed by about one liter of liquid isobutane. The isobutane was prepurified by passing it through beds containing activated charcoal and alumina. Stirring was started and ethylene was supplied on demand to maintain 550 psig. Under these conditions the polyethylene produced does not dissolve in the isobutane, but reamins in slurry form. After the reactor was pressurized, the reaction was allowed to proceed at 109° C. until about 4000 grams of resin were made per gram of catalyst. The reaction was terminated by venting off isobutane and excess ethylene from the reactor. The resulting polyethylene had a melt index of about 6.5 measured according to ASTM D1238-79, Condition E, Procedure B. The surface area and pore volume measured by nitrogen BET method are listed in Table I along with the catalytic activity.

EXAMPLES 2–5

The procedure of example 1 was followed identically except using different glycol ether compounds as listed in Table I below. The melt indices of the resulting polyethylene produced using the catalysts is also given in Table I.

TABLE I

| Ex. | Solvent | Surf. Area ($m^2$/g) | Pore Vol. (cc/g) | Activity (g/g/hr) | Melt Index |
|-----|---------|----------------------|------------------|-------------------|------------|
| 1 | EEA | 535 | 2.47 | 8490 | 6.5 |
| 2 | PTB | 530 | 2.62 | 7770 | 6.7 |
| 3 | PMA | 527 | 2.57 | 7830 | 6.6 |
| 4 | ProB | 530 | 2.64 | 7480 | 6.8 |
| 5 | EEP | 532 | 2.55 | 7710 | 6.1 |

EEA = ethoxy ethyl acetate
PTB = tert-butoxy propanol
PMA = methoxy propyl acetate

TABLE I-continued

| Ex. | Solvent | Surf. Area (m²/g) | Pore Vol. (cc/g) | Activity (g/g/hr) | Melt Index |
|-----|---------|-------------------|------------------|-------------------|------------|

ProB = n-butoxy propanol
EEP = ethoxy ethyl propionate

What is claimed is:

1. In a method of making a chromium-containing oxide gel-based catalyst wherein an oxide hydrogel selected from the group consisting of silica gel, chromium-silica cogel, silica-titania cogel, chromium-silica-titania tergel and mixtures thereof is converted to a xerogel by azeotropic distillation of a mixture of said hydrogel and an organic solvent, the improvement comprising impregnating the gel with a chromium compound during azeotropic distillation by incorporating said chromium compound into said mixture before azeotropic distillation and wherein the organic solvent used is selected from the group consisting of ethoxy ethyl acetate, tert-butoxy propanol, methoxy propyl acetate, n-butoxy propanol, ethoxy ethyl propionate and mixtures thereof.

2. A method of producing an oxide xerogel suitable for use as a polyolefin catalyst by removing water from an oxide hydrogel, the method comprising:

(a) contacting a water-containing oxide hydrogel selected from the group consisting of silica gel, chromium-silica cogel, silica-titania cogel, chromium-silica-titania tergel and mixtures thereof with an organic liquid selected from the group consisting of ethoxy ethyl acetate, tert-butoxy propanol, methoxy propyl acetate, n-butoxy propanol, ethoxy ethyl propionate and mixtures thereof, and a chromium compound to form a mixture, (b) removing water from the hydrogel resulting from step (a) by azeotropic distillation to form a chromium impregnated xerogel containing said organic liquid, (c) removing said organic liquid from said xerogel.

3. The method of claim 2 wherein the amount of said chromium compound added is sufficient to leave about 0.1–2.0 wt. % Cr in the xerogel resulting from step (c).

4. The method of claim 3 wherein step (c) comprises evaporating said organic liquid.

5. The method of claim 4 wherein the xerogel is calcined after said evaporation.

6. The method of claim 5 wherein said calcination is conducted at about 425°–760° C.

7. The method of claim 2 wherein said azeotropic distillation is carried out under reduced pressure.

8. The method of claim 2 wherein said chromium compound is selected from the group consisting of chromium acetylacetonate, chromium acetate and chromium nitrate.

9. The method of claim 2 wherein the hydrogel is impregnated with a chromium compound before step (a).

10. The method of claim 9 wherein said impregnation is performed using an aqueous solution of said chromium compound.

11. A method of producing an oxide xerogel suitable for use as a polyolefin catalyst by removing water from an oxide hydrogel, the method comprising:

(a) contacting a water-containing oxide hydrogel selected from the group consisting of silica gel, chromium-silica cogel, silica-titania cogel, chromium-silica-titania tergel and mixtures thereof with an organic liquid selected from the group consisting of ethoxy ethyl acetate, tert-butoxy propanol, methoxy propyl acetate, n-butoxy propanol, ethoxy ethyl propionate and mixtures thereof in the amount of about 100–300% based on the volume of said hydrogel to form a mixture, (b) removing water from the hydrogel resulting from step (a) by azeotropic distillation to form a chromium impregnated xerogel containing said organic liquid, and (c) removing said organic liquid from said xerogel.

* * * * *